INVENTOR.
ROBERT W. BRADFORD
BY
ATTORNEY

United States Patent Office 3,517,265
Patented June 23, 1970

3,517,265
DEIONIZING AND FAULT PROTECTION CIRCUIT FOR A LINE-TYPE PULSER
Robert W. Bradford, Menlo Park, Calif., assignor to the United States of America as represented by the United States Atomic Energy Commission
Filed Apr. 16, 1968, Ser. No. 721,757
Int. Cl. H02h 7/20
U.S. Cl. 317—51                                    10 Claims

ABSTRACT OF THE DISCLOSURE

A protective and reverse biasing circuit for a switch tube in a line-type pulser, for providing a safe low impedance breakdown path around the switch tube through a series of voltage regulating bulk avalanche diodes that conduct short circuit load currents such as frequently occur with klystron loads, and for providing from a capacitor connected across the voltage regulating diodes a reverse bias voltage for deionizing the switch tube during normal pulser operation.

BACKGROUND OF THE INVENTION

The present invention relates to end-of-line clipper circuits for a switch tube in a line-type pulser, and more particularly, it relates to a circuit that provides a safe low impedance breakdown path around the switch tube for short circuit load currents and further provides a reverse bias deionizing voltage to the switch tube.

The invention disclosed herein was made under, or in, the course of Contract AT(04-3)–400 with the United States Atomic Energy Commission.

Line-type pulsers are commonly used for pulsing loads which are susceptible to arcing that results in fault or short circuit currents. An example of such a load is a klystron tube having a modulating anode to which very high voltage pulses are applied with a line-type pulser. The arcing from anode to cathode that commonly occurs in klystrons requires that provision be made for safely handling the short circuit currents through a low impedance path. Otherwise the short circuit currents build up a reverse charge in the pulse forming network that causes a nearly full reverse voltage across the network so that during the next charging cycle the network is charged to nearly twice its normal voltage. Such an overvoltage causes the klystron to again arc and a reverse voltage to be built up in the pulse forming network nearly equal to the overvoltage. Arcing and successive building up of the reverse voltage eventually causes breakdown of the pulser switch, usually a thyratron tube, or other pulser components. Line-type pulser designs, therefore, generally include a circuit for discharging short circuit load currents and thereby preventing the build up of large reverse voltages during klystron arcing. Furthermore, for pulsers utilizing thyratron switch tubes, provision is usually made, especially for fast pulsers, to provide a deionizing voltage across the switch tube to rapidly inactivate the tube so that it may be more quickly triggered to form the next pulse.

In one known prior art circuit, disclosed in U.S. Pat. No. 3,322,975, issued May 30, 1967, to W. I. Smith, an end-of-line clipper circuit is disclosed that comprises, in essence, a diode, a thyrite resistor and a matching resistor in series across the capacitor at the low voltage end of a pulse forming network. The pulser is switched with a gas tube for driving a klystron or magnetron load. The thyrite resistor presents a high resistance to the voltages across the load during normal operation but when subjected to the voltages resulting from an arc at the load, the thyrite resistance becomes much lower to provide a safe low impedance path for the short circuit currents. The series resistance is provided to match the pulse forming network to the load during its arcing to obtain maximum power transfer to terminate the arc. The diode in series with the thyrite is in such a direction as to prevent shorting of the pulse forming network during its charging cycle. Electric charges remaining on the ground side of the capacitor in the pulse forming network, and held thereby the inductance of the load during normal operation, are sufficient to cause a relatively small current through the diode thyrite resistor and matching impedance so as to cause a reverse deionizing voltage to be applied to the switch tube. There are, however, several disadvantages in this type of circuit: there is a constant dissipation of power to maintain the deionizing voltage; in order for the circuit to handle higher peak currents, more thyrite resistors must be added in parallel; in operation thyrites have been found to be susceptible to frequent failures since they cannot be subjected to repeated high peak short circuit currents and voltages, the number of thyrites required to reduce such failures being so great as to make thyrites economically disadvantageous; furthermore, there is an inherent lag of thyrite resistors in responding to a fault voltage due to the normal high initial impedance presented to the inverse voltage and relatively slow rate of change from this high impedance to the low impedance; and in normal operation, there is less time available for deionizing the switch tube due to ripple of the deionizing voltage. The slow response of thyrites to inverse fault voltages and the ripple of the deionizing voltage makes the circuit unfeasible for use in very fast line-type pulsing systems.

SUMMARY OF THE INVENTION

In accordance with the present invention, a protection and deionizing circuit is provided for a switch tube of a line-type pulser. The circuit includes charge storage means across the capacitor at the low voltage end of a pulse forming network of the pulser for immediately absorbing short circuit load currents. A voltage regulating device is connected across the charge storage means for discharging the short circuit currents therefrom under short circuit load conditions. During normal operation, the voltage regulating device charges the charge storage means to a constant deionizing voltage level that is applied to the switch tube without dissipation of significant power. Unidirectional current conducting means are also provided in the circuit to prevent application of normal high voltage pulses to the charge storage means to thereby ensure a constant deionizing voltage level and prevent shorting of the normal high voltage pulses through the voltage regulating device.

An object of the invention is to provide an improved combined fault voltage and current protection circuit and a deionizing circuit for a switch tube in a line-type pulser.

Another object is to provide a fault voltage and current protection circuit that has a fast response to short circuit currents and voltages, is reliable in operation over long periods, and maintains a constant deionizing voltage for the switch tube without significant dissipation of power.

DESCRIPTION OF AN EMBODIMENT

Figure 1:
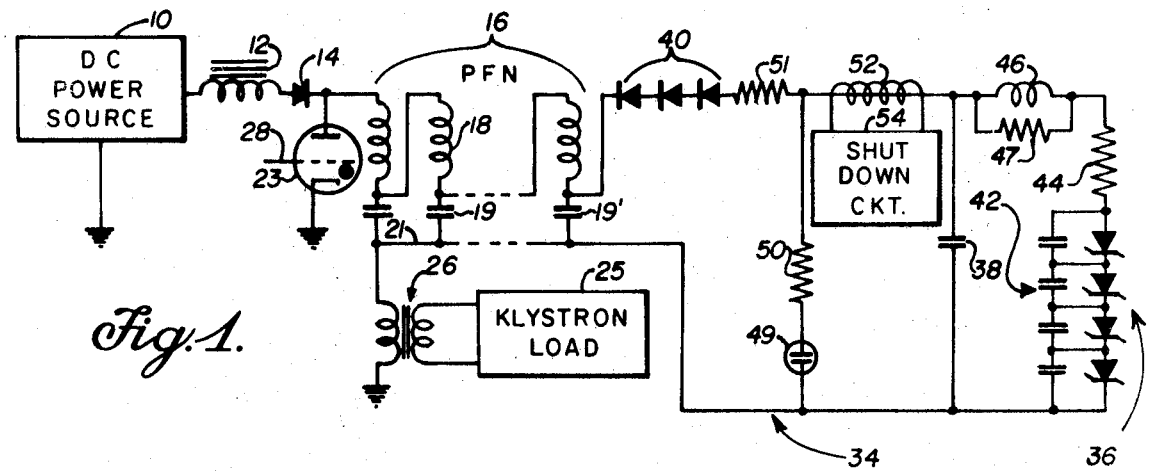
FIG. 1 is a schematic diagram of a line-type pulser including a switch tube and an end-of-line clipper circuit for protecting the tube against high inverse voltages and for providing the tube with a constant deionizing potential, according to the invention.

Referring to the drawing, a line-type pulser is shown in FIG. 1 that includes a DC power source 10 for supplying a charging current through a charging choke 12 and a charging diode 14 to a pulse forming network 16. The pulse forming network (PFN) 16 is comprised of a plurality of serially connected coils 18 with a capacitor 19 shunted across one end of each coil to a common point 21. Charging current is supplied from the source to the PFN capacitors 19 until the voltage across the PFN is equal to that of the source. The source current to the PFN then drops to zero while the voltage across the charging choke 12 reverses and continues to supply charging current to the capacitors 19, charging them to a voltage level that is nearly twice that of the source 10. The diode 14 prevents discharge of the high voltage in the PFN to the source 10.

Figure 2:
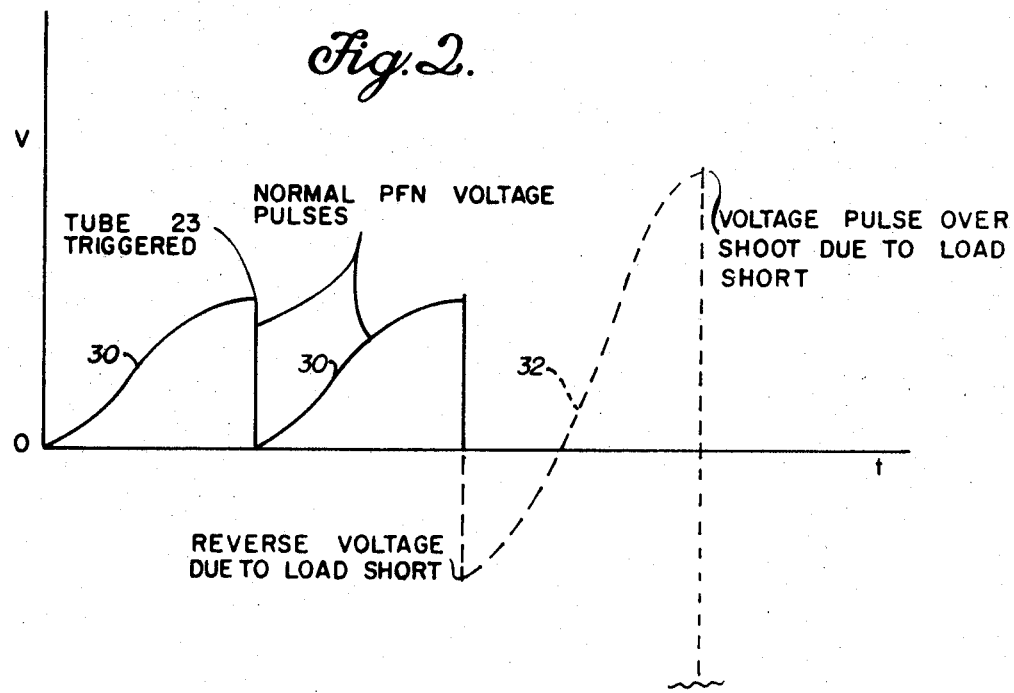
FIG. 2 is a diagram of voltage waveforms that are normally applied to the switch tube of FIG. 1 as compared to an overvoltage waveform that would result from a load arc in an unprotected pulser.

A thyratron switch tube 23 is connected in series with a klystron load 25 through a pulse transformer 26 across the PFN 16. When the PFN is charged to the desired voltage, a triggering pulse is applied to a terminal 28 for raising the grid of the tube 23 to a level that permits breakdown and current conduction through the tube. The high voltage side of the PFN 16 is thereby connected to ground, causing a large pulse to be applied to the transformer 26 with a resulting high voltage pulse supplied to the modulating anode of the klystron load 25. In FIG. 2 are shown voltage pulse waveforms 30 which normally appear across the pulse forming network 16, the tube 23 being triggered at the peak of the pulses 30. Due to the very high voltages applied to the modulating anode, frequent arcing to the cathode of the klystron occurs. Such arcing constitutes a short circuit in the load 25 which results in very large currents being conducted through the pulse transformer 26 to the low voltage side of the capacitors 19. In the absence of a protective circuit, the capacitors 19 would be thereby charged in the reverse direction and prevent it from discharging because of normal deionization of the tube 23 soon after its triggering. Thus, during a charging cycle following a load short, the capacitors 19 initially would have a high reverse voltage, causing the pulse forming network to accept a larger than normal charging pulse from the source 10 prior to the triggering of the tube 23. Due to the larger charge applied to the capacitors 19, an abnormally high voltage pulse 32 would be built up from the high voltage side of the PFN to ground. Application of the high voltage pulse 32 to the klystron load would again cause the klystron to arc and cause additional charge to be built up on the low voltage side of the capacitors 19. This process would continue with successively larger charges and higher voltages being built up in the reverse direction across the PFN until the reverse breakdown voltage of the tube 23 is reached, likely within one cycle, causing it to conduct in the reverse direction. Such conduction would cause failure of the tube 23 which is generally expensive, and in any case would cause a shutdown of the entire pulser circuit.

In accordance with the invention, a safe low impedance path for dissipation of the fault or short circuit load currents is provided by means of an end-of-line switch tube protection and deionizing circuit 34. The circuit 34 includes primary voltage regulating means comprising four serially connected bulk avalanche diodes 36 for providing a safe low impedance fault current discharge path across the capacitors 19. Charge storage means in the form of an energy storage (low inductance) capacitor 38 is connected across the diodes 36 for immediately absorbing fault currents and for supplying a constant switch tube deionizing voltage during normal operation. Unidirectional current means in the form of rectifying diodes 40 are connected in series with the parallel combination of capacitor 38 and voltage regulating diodes 36 across an end-of-line capacitor 19'. The diodes 40 block discharge of normal PFN voltage pulses through the diodes 36 in the forward direction. They also prevent discharge of the normal negative deionizing voltage from the capacitor 38.

Under short circuit load conditions, a large positive charge is built up on the low voltage side of the capacitors 19. This charge is immediately absorbed by the energy storage capacitor 38, thereby preventing a dangerous voltage from appearing across the PFN 16. The fault voltage causes the diodes 36 to breakdown in the reverse direction to provide a discharge path for the fault current and the absorbed charge.

In normal operation, the diodes 36 are matched to the normal pulse forming network voltage pulses 30 so that the pulses are slightly greater than the breakdown voltage of the diodes, initially causing a slight current flow therethrough. This current is limited by a resistor 44 connected in series with the diodes 36. An inverse voltage is developed thereby across the diodes 36 and resistor 44 and is applied to the capacitor 38, charging the upper plate negatively. After the capacitor 38 becomes fully charged negatively, there will be no current flow through the diodes 36 until the reverse voltage exceeds the negative voltage across the capacitor 38. Since the capacitor 38 cannot discharge through the diodes 36 at this level, the negative voltage level across the capacitor 38 is maintained substantially constant without significant dissipation of power. This constant negative voltage is available for rapid deionization of the switch tube 23 after each firing.

A capacitor 42 is connected across each of the diodes 36 to ensure equal voltage division across the diodes 36, thereby enhancing the voltage regulation function of the diodes.

A transient suppression circuit comprising a low inductance coil 46 in parallel with a small resistor 47 is connected in series with the diodes 46 and resistor 44. The suppression circuit constitutes a low pass filter and is effective for blocking transient high voltages which would otherwise cause breakdown of diodes 36 and consequent disruption of the pulser operation.

Although the voltage regulating diodes 36 are adequate to handle most short circuit load currents, very high peak fault voltages and currents occasionally occur. Supplementary voltage regulating means in the form of a spark gap 49 is connected in series with a damping resistor 50 to provide a parallel path for the occasional very high short circuit load currents. For these very high currents, a matching resistor 51 is provided in series with the damping resistor 50 to prevent oscillations in the circuit and to thereby ensure maximum transfer of power.

Should the peak voltage across the diodes 36, due to a short circuit in the load 25, become so high as to cause destructive currents to be conducted through the diodes, a sensing coil 52 is connected in series with the capacitor 38 and diodes 36 for activating a shutdown circuit 54. This stops further operation of the pulser and its possible destruction.

In practice, the arrangement described has been found to be effective, reliable, and very fast. The energy storage capacitor 38 immediately absorbs fault currents; the diodes 36 start to conduct immediately at the peak of normal PFN voltage pulses and therefore also start discharge of fault currents at this point; and the spark gap 49 provides an effective shunt path for very high fault currents. In the particular arrangement, the diodes 36 have been found to be reliable and long lasting. The deionizing potential on the capacitor 38 is maintained constant without significant dissipation of power since there are no discharge paths below the deionizing potential level. Once the capacitor is charged very little charge is thereafter required. The constant regulation of the deionizing potential is important for fast operation of the pulser in that a reverse deionizing potential is immediately available at a constant high level for deionization of the tube 23.

A protection and deionizing circuit 34, exemplifying the invention, was constructed with components having the following values:

The diodes 36 were 1 kv., 100 amp, bulk avalanche diodes.

The capacitor 38 was a 10 microfarad, 6 kv. energy storage (low inductance) capacitor.

The capacitors 42 were each .005 microfarad.

The resistor 44 was a 1000 ohm, 160 watt resistor.

The coil 46 was a 100 microhenry coil.

The resistor 47 was a 5K, 50 watt resistor.

The spark gap 49 was a 6 kv. spark gap.

The resistor 50 was a 5 ohm, 160 watt resistor.

The resistor 51 was a 5 ohm resistor.

The charging voltage pulses 30 had a period of 2.7 milliseconds and a peak voltage of 43 kv. nominal. The circuit 34 was found to be capable of handling peak fault currents up to 5000 amps within a period of 2.5 microseconds.

While an embodiment of the invention has been shown and described, further embodiments or combinations of those described herein will be apparent to those skilled in the art without departing from the spirit of the invention or from the scope of the appended claims.

What I claim is:

1. A deionizing and short circuit protection circuit for protecting a line-type pulser against short circuit load currents and for supplying a deionizing potential to the pulser during normal operation, said pulser including a pulse forming network having a capacitor at its low voltage end, comprising:
    (a) unidirectional current conduction means;
    (b) charge storage means serially connected with said current conduction means across said end capacitor for immediately absorbing short circuit load currents; and
    (c) primary voltage regulating means connected across said charge storage means for discharging said charge storage means above a predetermined voltage level, said unidirectional current conduction means being effective to block application of normal pulser voltages to said charge storage means and said voltage regulating means.

2. A deionizing and short circuit protection circuit according to claim 1, wherein said charge storage means is an energy storage capacitor, said unidirectional current conduction means is a plurality of serially connected rectifier diodes, and said voltage regulating means includes a plurality of serially connected bulk avalanche diodes.

3. A deionizing and short circuit protection circuit according to claim 2, further including a plurality of capacitors each connected respectively across one of said bulk avalanche diodes for ensuring uniform voltage drops thereacross for providing constant voltage regulation at said predetermined level.

4. A deionizing and short circuit protection circuit according to claim 1, wherein said voltage regulating means includes a resistance for limiting current through said voltage regulating means during normal pulser operation, said resistance being further operative to limit short circuit load currents through said voltage regulating means.

5. A deionizing and short circuit protection circuit according to claim 1, further including supplementary voltage regulating means shunting said primary voltage regulating means for discharging abnormally large short circuit load currents.

6. A deionizing and short circuit protection circuit according to claim 5, wherein said supplementary voltage regulating means includes a spark gap.

7. A deionizing and short circuit protection circuit according to claim 6, wherein said supplementary voltage regulating means further includes a limiting resistor serially connected with said spark gap.

8. A deionizing and short circuit protection circuit according to claim 1, further including a matching resistor serially connected with said unidirectional current conduction means for lengthening the period of transfer of said short circuit load currents.

9. A deionizing and short circuit protection circuit according to claim 1, wherein said primary voltage regulating means includes a transient suppression network comprising a coil and resistance connected in parallel for preventing conduction of high frequency voltage transients through said voltage regulating means.

10. A deionizing and short circuit protection circuit according to claim 1, further including pulser shutdown means responsive to a predetermined conduction level through said primary voltage regulating means for stopping operation of said pulser.

References Cited

UNITED STATES PATENTS 3,322,975    5/1967    Smith _____ 328—8 X

LEE T. HIX, Primary Examiner

H. FENDELMAN, Assistant Examiner

U.S. Cl. X.R.

320—1; 328—8, 67